(12) United States Patent
Boivie et al.

(10) Patent No.: US 10,007,808 B2
(45) Date of Patent: *Jun. 26, 2018

(54) PROTECTING APPLICATION PROGRAMS FROM MALICIOUS SOFTWARE OR MALWARE

(71) Applicant: International Business Machines Corporation, Armonk, NY (US)

(72) Inventors: Richard Harold Boivie, Hawthorne, NY (US); Dimitrios Pendarakis, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/804,379

(22) Filed: Nov. 6, 2017

(65) Prior Publication Data

US 2018/0060610 A1     Mar. 1, 2018

Related U.S. Application Data

(63) Continuation of application No. 13/226,079, filed on Sep. 6, 2011, now Pat. No. 9,846,789.

(51) Int. Cl.
    *G06F 21/00*    (2013.01)
    *G06F 21/74*    (2013.01)
(52) U.S. Cl.
    CPC .................................. *G06F 21/74* (2013.01)
(58) Field of Classification Search
    None
    See application file for complete search history.

(56) References Cited

U.S. PATENT DOCUMENTS

| 4,573,119 A | 2/1986 | Westheimer |
| 5,222,139 A | 6/1993 | Takaragi et al. |
| 5,481,613 A | 1/1996 | Ford et al. |
| 5,615,263 A | 3/1997 | Takahashi |
| 5,748,782 A | 5/1998 | Ferreira et al. |

(Continued)

FOREIGN PATENT DOCUMENTS

| CN | 1309351 A | 8/2001 |
| JP | H 07287514 A | 10/1995 |

(Continued)

OTHER PUBLICATIONS

Vaishnavi, R.; Anand, Jose; Janarthanan, R. Efficient Security for Desktop Data Grid Using Cryptographic Protocol. 2009 International Conference on Control, Automation, Communication and Energy Conservation. INCACEC 2009. Pub. Date: 2009. http://ieeexplore.ieee.org/stamp/stamp.jsp?tp=&arnumber=5204488.*

(Continued)

*Primary Examiner* — Jeremiah Avery
(74) *Attorney, Agent, or Firm* — Jeff S. LaBaw, Esq.; McGinn IP Law Group, PLLC

(57) ABSTRACT

A computer system, includes a crypto mechanism that decrypts and integrity-checks Secure Object information as the Secure Object information moves into the computer system from an external storage and encrypts and updates an integrity value for Secure Object information as the Secure Object information moves out of the computer system to the external storage.

24 Claims, 6 Drawing Sheets

(56) References Cited

U.S. PATENT DOCUMENTS

| | | | |
|---|---|---|---|
| 5,845,281 A | 12/1998 | Benson et al. | |
| 6,185,685 B1 | 2/2001 | Morgan et al. | |
| 6,397,331 B1 | 5/2002 | Ober et al. | |
| 6,523,118 B1 | 2/2003 | Buer | |
| 6,704,871 B1* | 3/2004 | Kaplan | G06F 21/72 713/192 |
| 6,708,273 B1* | 3/2004 | Ober | G06F 8/60 713/189 |
| 6,751,709 B2 | 6/2004 | Seidl et al. | |
| 6,807,577 B1 | 10/2004 | Gillespie | |
| 6,968,420 B1 | 11/2005 | Giles et al. | |
| 7,043,616 B1 | 5/2006 | McGrath | |
| 7,055,040 B2 | 5/2006 | Klemba et al. | |
| 7,136,488 B2 | 11/2006 | Hashimoto et al. | |
| 7,167,956 B1 | 1/2007 | Wright et al. | |
| 7,249,225 B1 | 7/2007 | Seidl et al. | |
| 7,260,726 B1 | 8/2007 | Doe et al. | |
| 7,290,288 B2 | 10/2007 | Gregg et al. | |
| 7,483,930 B1 | 1/2009 | Wright et al. | |
| 7,516,331 B2 | 4/2009 | Jin et al. | |
| 7,747,877 B2 | 6/2010 | Jin et al. | |
| 7,865,733 B2 | 1/2011 | Goto et al. | |
| 7,933,413 B2 | 4/2011 | Steeves et al. | |
| 8,041,947 B2 | 10/2011 | O'Brien et al. | |
| 8,055,910 B2 | 11/2011 | Kocher et al. | |
| 8,086,871 B2 | 12/2011 | McIntosh et al. | |
| 8,108,641 B2 | 1/2012 | Goss et al. | |
| 8,170,205 B2* | 5/2012 | Takeda | G06F 12/1408 380/239 |
| 8,381,288 B2* | 2/2013 | Sahita | G06F 12/145 711/154 |
| 8,392,725 B2 | 3/2013 | McIntosh et al. | |
| 8,464,011 B2 | 6/2013 | Krig | |
| 8,479,286 B2* | 7/2013 | Dalcher | G06F 11/3466 726/22 |
| 8,572,400 B2 | 10/2013 | Lin et al. | |
| 8,738,932 B2* | 5/2014 | Lee | G06F 21/72 713/164 |
| 8,782,435 B1 | 7/2014 | Ghose | |
| 9,311,458 B2 | 4/2016 | Mangalampalli | |
| 2001/0010722 A1 | 8/2001 | Enari | |
| 2001/0014157 A1 | 8/2001 | Hashimoto et al. | |
| 2001/0050990 A1 | 12/2001 | Sudia | |
| 2002/0064283 A1 | 5/2002 | Parenty | |
| 2002/0101995 A1 | 8/2002 | Hashimoto | |
| 2002/0172368 A1 | 11/2002 | Peterka | |
| 2004/0003262 A1 | 1/2004 | England | |
| 2004/0039926 A1 | 2/2004 | Lambert | |
| 2004/0123127 A1 | 6/2004 | Teicher et al. | |
| 2004/0139346 A1 | 7/2004 | Watt | |
| 2004/0181303 A1 | 9/2004 | Walmsley | |
| 2005/0038998 A1 | 2/2005 | Ueno | |
| 2005/0044390 A1 | 2/2005 | Trostle | |
| 2005/0076226 A1 | 4/2005 | Boivie et al. | |
| 2005/0105738 A1 | 5/2005 | Hashimoto | |
| 2005/0108507 A1 | 5/2005 | Chheda | |
| 2005/0108551 A1 | 5/2005 | Toomey | |
| 2005/0166069 A1 | 7/2005 | Hashimoto et al. | |
| 2005/0177742 A1 | 8/2005 | Benson et al. | |
| 2005/0235148 A1 | 10/2005 | Scheidt | |
| 2005/0257079 A1 | 11/2005 | Arcangeli | |
| 2006/0106801 A1 | 5/2006 | Cox et al. | |
| 2006/0156418 A1 | 7/2006 | Polozoff | |
| 2006/0242611 A1 | 10/2006 | Drake | |
| 2007/0006294 A1* | 1/2007 | Hunter | G06F 21/606 726/14 |
| 2007/0047735 A1 | 3/2007 | Celli et al. | |
| 2007/0133795 A1 | 6/2007 | Kahn et al. | |
| 2007/0101124 A1 | 7/2007 | Pitts | |
| 2008/0046762 A1 | 2/2008 | Kershaw | |
| 2008/0072068 A1 | 3/2008 | Wang et al. | |
| 2008/0109903 A1 | 5/2008 | Werner et al. | |
| 2008/0133935 A1 | 6/2008 | Elovici | |
| 2008/0155273 A1 | 6/2008 | Conti | |
| 2008/0205651 A1 | 8/2008 | Goto et al. | |
| 2008/0222420 A1 | 9/2008 | Serret-Avila | |
| 2008/0270806 A1 | 10/2008 | Nakamura | |
| 2008/0282093 A1 | 11/2008 | Hatakeyama | |
| 2008/0288786 A1 | 11/2008 | Fiske | |
| 2008/0301441 A1 | 12/2008 | Calman et al. | |
| 2008/0319782 A1 | 12/2008 | Good | |
| 2009/0006796 A1 | 1/2009 | Chang et al. | |
| 2009/0006864 A1 | 1/2009 | Hashimoto et al. | |
| 2009/0113136 A1 | 4/2009 | Aharonov | |
| 2009/0217385 A1 | 8/2009 | Teow | |
| 2009/0240717 A1 | 9/2009 | Mimatsu | |
| 2009/0259857 A1 | 10/2009 | Gehrmann | |
| 2009/0300366 A1 | 12/2009 | Gueller et al. | |
| 2010/0017625 A1 | 1/2010 | Johnson | |
| 2010/0031061 A1 | 2/2010 | Watanabe et al. | |
| 2010/0119068 A1 | 5/2010 | Harris | |
| 2010/0153746 A1 | 6/2010 | Takeuchi et al. | |
| 2010/0161904 A1 | 6/2010 | Cypher et al. | |
| 2010/0262824 A1 | 10/2010 | Keshavachar et al. | |
| 2010/0281273 A1 | 11/2010 | Lee et al. | |
| 2010/0325446 A1 | 12/2010 | Mordetsky | |
| 2011/0064217 A1 | 3/2011 | Fry et al. | |

FOREIGN PATENT DOCUMENTS

| | | |
|---|---|---|
| JP | 2001-230770 A | 8/2001 |
| JP | 2001-318787 A | 11/2001 |
| JP | 2002-232417 A | 8/2002 |
| JP | 2006-018528 A | 1/2006 |
| JP | 2006-209703 A | 8/2006 |
| JP | 2006-227777 A | 8/2006 |
| JP | 2006-309766 A | 11/2006 |
| JP | 2007-514994 A | 6/2007 |
| JP | 2007-233426 A | 9/2007 |
| JP | 2008-210225 A | 9/2008 |
| TW | 200822068 A | 5/2008 |
| TW | 200841682 A | 10/2008 |
| WO | WO 98/54633 A1 | 12/1998 |
| WO | WO 2005-096120 A1 | 10/2005 |
| WO | WO 2008/003833 A1 | 1/2008 |

OTHER PUBLICATIONS

Miyazaki, Toshiaki; Murooka, Takahiro; Takahashi, Noriyuki; Hashimoto, Masashi. Real-time Packet Editing Using Reconfigurable Hardware for Active Networking. 2002 IEEE International Conference on Field-Programmable Technology. Pub. Date: 2002. http://ieeexplore.ieee.org/stamp/stamp.jsp?tp=&arnumber=1188661.*

Haifeng, et al. "Memory Confidentiality and Integrity Protection Method Based on Variable Length Counter", 2012, IEEE, p. 290-294.

Frincke, "Developing Secure Objects"; Google, 1995-1996.

Somogyi, et al., "NbIDL: Secure, Object-Oriented, Client-Server Middleware", Google, 1998.

SAP Functions in Detail; "Crystal Reports Server—A Functional Overview", Google, 2008.

PCT Notification Concerning Transmittal of International Preliminary Report on Patentability dated Jan. 12, 2012 (PCT Application No. PCT/US2010/001811).

Henry Levy, Capability-Based Computer Systems, Published by Digital Press 1984. http://www.cs.washington.edu/homes/levy/capabook.

Theodore A. Linden, Operating System Structure to Support Security and Reliable Software, Institute for Computer Sciences and Technology, National Bureau of Standards, Washington, DC 20234 http://delivery.acm.org/10.1145/360000/356682/P409.linden.pdf— Abstract Only ACM Computing Survey (CSUR), vol. 8, Issue 4, Dec. 1976.

Canetti, et al., "A Two Layers Approach for Securing an Object Store Network", Proceedings of the First International IEEE Security in Storage Work-Shop (2002) (SISW'02), 1-14.

Wang, et al., "Keep Passwords Away from Memory: Password Caching and Verification Using TPM", $22^{nd}$ International Confer-

(56) References Cited

OTHER PUBLICATIONS ence on Advanced Information Networking and Applications, IEEE, 755-762, DOI: 10.1109/AINA, 2008.109.
Catrein, et al. "Private Domains in Networks of Information", IEEE International Conference Communications (ICC) Work-Shops, 2009.1-5.
PCT Notification of Transmittal of the International Search Report and the Written Opinion of the International Searching Authority, or the Declaration dated Oct. 1, 2010.
Williams, et al., "CPU Support for Secure Executables", The 4th International Conference on Trust and Trustworthy Computing, Jun. 22-24, 2011, Pittsburgh, PA.
Williams, et al., "CPU Support for Secure Executables" Stony Brook University, Power Point Presentation at the 4th International Conference on Trust and Trustworthy Computing, Jun. 22-24, 2011, Pittsburgh, PA.
United States Office Action dated Aug. 14, 2013 in U.S. Appl. No. 13/226,079.
United States Office Action dated Aug. 14, 2013 in U.S. Appl. No. 12/492,738.
United States Office Action dated Oct. 8, 2014 in U.S. Appl. No. 13/226,079.
United States Notice of Allowance dated Jul. 7, 2014 in U.S. Appl. No. 13/033,455.
United States Notice of Allowance dated May 5, 2014 in U.S. Appl. No. 12/492,738.
Suh, et al., "Efficient Memory Integrity Verification and Encryption for Secure Processors", 36th International Symposium on Microarchitecture, 2003 IEEE, pp. 1-12.
Yang, et al., "Fast Secure Processor for Inhibiting Software Piracy and Tampering", 36th International Symposium to Microarchitecuture, 2003 IEEE, pp. 1-10.
United States Office Action dated Feb. 12, 2014 in U.S. Appl. No. 12/492,738.
United States Office Action dated Mar. 19, 2014 in U.S. Appl. No. 13/226,079.
United States Office Action dated Oct. 4, 2013 in U.S. Appl. No. 12/878,696.
United States Office Action dated Mar. 13, 2015 in U.S. Appl. No. 13/226,079.
Haifend, "Memory Confidentiality and Integrity Protection Method Based on Variable Length Counter", Dec. 1, 2014, Journal of Algorithms & Computational Technology, pp. 421-439.
United Sates Office Action dated Jun. 26, 2015, in U.S. Appl. No. 12/878,696.
United States Office Action dated Nov. 23, 2015, in U.S. Appl. No. 14/454,075.
United States Office Action dated Nov. 9, 2012 in U.S. Appl. No. 13/033,367.
United States Office Action dated Mar. 26, 2012, in U.S. Appl. No. 12/492,738.
United States Office Action dated Dec. 3, 2014, in U.S. Appl. No. 14/454,075.
United States Office Action dated Dec. 3, 3014, in U.S. Appl. No. 14/017,555.
United States Office Action dated May 30, 2014, in co-pending U.S. Appl. No. 14/017,555.
United States Notice of Allowance dated Mar. 26, 2015, in U.S. Appl. No. 14/017,555.
United States Notice of Allowance dated Jul. 23, 2013 in U.S. Appl. No. 13/033,367.
Combined Search and Examination Report dated Dec. 20, 2012.
United States Office Action dated Jun. 5, 2013 in U.S. Appl. No. 12/492,738.
United States Office Action dated Mar. 25, 2013 in U.S. Appl. No. 13/033,367.
United States Office Action dated Nov. 20, 2012 in U.S. Appl. No. 13/033,455.
United States Office Action dated May 24, 2016, in U.S. Appl. No. 14/745,851.
European Search Report dated Mar. 4, 2016.
United States Office Action dated Nov. 23, 2016, in U.S. Appl. No. 15/149,884.
United States Office Action dated Nov. 29, 2016, in U.S. Appl. No. 14/745,851.
United States Office Action dated Jan. 25, 2017, in U.S. Appl. No. 14/954,977.
United States Notice of Allowance dated Aug. 4, 2017, in U.S. Appl. No. 13/226,079.
Haris Lekatsas, et al., "Cypress: Compression and Encryption of Data and Code for Embedded Multimedia Systems", IEEE Design & Test of Computers, vol. 21, Issue 5, Publication Date: 2004. http://ieeexplore.ieee.org/stamp/stamp.jsp?arnumber=1341379.
Crispin Cowan, et al., "Buffer Overflows: Attacks and Defenses for the Vulnerability of the Decade" Foundations of Instrusion Tolerant Systems, Publication Date: 2003. http://eeexplore.ieee.org/stam/stamp.jsp?arnumber+1264935.
United States Notice of Allowance dated Sep. 1, 2017, in U.S. Appl. No. 14/954,977.
Jiang, "On Information System Security Architecture", 2004, Journal of Systems Science and Information, vol. 2, pp. 637-645.
United States Notice of Allowance dated Sep. 13, 2017, in U.S. Appl. No. 15/246,277.
United States Notice of Allowance dated Feb. 16, 2018, in U.S. Appl. No. 15/492,121.
di Vimercati, "Efficient Integrity Checks for Join Queries in the Cloud", 2016, Journal of Computer Security, pp. 347-378.

\* cited by examiner

PROTECTING APPLICATION PROGRAMS FROM MALICIOUS SOFTWARE OR MALWARE

RELATED APPLICATIONS

This Application is a Continuation Application of U.S. patent application Ser. No. 13/226,079, filed on Sep. 6, 2011.

CROSS-REFERENCE TO RELATED APPLICATIONS

The present application is related to the following co-pending applications:

U.S. patent application Ser. No. 12/492,738, filed on Jun. 26, 2009, to Richard H. Boivie, entitled "SUPPORT FOR SECURE OBJECTS IN A COMPUTER SYSTEM";

U.S. patent application Ser. No. 12/878,696, filed on Sep. 9, 2010, to Richard H. Boivie, entitled "CACHE STRUCTURE FOR A COMPUTER SYSTEM PROVIDING SUPPORT FOR SECURE OBJECTS";

U.S. patent application Ser. No. 13/033,455, filed on Feb. 23, 2011, to Boivie, et al., entitled "BUILDING AND DISTRIBUTING SECURE OBJECT SOFTWARE"; and U.S. patent application Ser. No. 13/033,367, filed on Feb. 23, 2011, to Boivie, et al., entitled "SECURE OBJECT HAVING PROTECTED REGION, INTEGRITY TREE, AND UNPROTECTED REGION, all assigned to the present assignee, and incorporated herein by reference.

BACKGROUND OF THE INVENTION

Field of the Invention

The present invention generally relates to protecting an application executing on a computer not only from attacks from "outside" the application but also from attempts to introduce malware "inside" the application through vulnerabilities in the application's interfaces. More specifically, the esm (EnterSecurityMode) instruction previously described in the above-identified co-pending applications, is extended to include two additional address range fields, a first of which tells the CPU hardware that the address range corresponding to code is "read only" from the perspective of the application, and the second of which tells the hardware that the address range corresponding to the application's data, stack, and heap is "no-execute."

Description of the Related Art

IBM Research has been developing an innovative secure processor architecture that provides for verifiably secure applications. The architecture protects the confidentiality and integrity of information in an application so that 'other software' cannot access that information or undetectably tamper with it.

The present invention protects an application not only from attacks from "outside" the application but also from attempts to introduce malware "inside" the application through vulnerabilities in the application's interfaces.

SUMMARY OF THE INVENTION

In view of the foregoing, and other, exemplary problems, drawbacks, and disadvantages of the previously-described security systems, it is an exemplary feature of the present invention to provide a structure (and method) in which an application is protected not only from attacks from "outside" the application but also from attempts to introduce malware "inside" the application.

It is another exemplary feature of the present invention to provide a structure and method for providing a mechanism using address ranges to provide protection against attempts to introduce malware "inside" the application.

In a first exemplary aspect, described herein is an apparatus including a memory to store a secure object comprising at least one of code and data that is encrypted when stored in said memory; and a central processing unit (CPU) capable of executing an EnterSecureMode (esm) instruction that enables decryption of the secure object information when the secure object information is retrieved from said memory into said CPU, the CPU further including a feature to protect the secure object from attacks that attempt to insert executable code into the secure object.

In a second exemplary aspect, also described herein is a method of enhancing security on a computer, including: providing an access to a memory to store a secure object comprising at least one of code and data that is encrypted when stored in the memory; and providing an EnterSecureMode (esm) instruction that enables decryption of the secure object information when the secure object information is retrieved from the memory into a central processing unit (CPU) of the computer, the CPU further including a feature to protect the secure object from code that the secure object receives from other software.

In a third exemplary aspect, also described herein is a controller for a computer, the controller including a memory device tangibly embodying a set of machine-readable instructions: providing an access to a memory to store a secure object comprising at least one of code and data that is encrypted when stored in the memory; and providing control of an EnterSecureMode (esm) instruction that enables decryption of the secure object's information when the secure object information is retrieved from the memory into a central processing unit (CPU) of the computer, the CPU further including a feature to protect the secure object from code that the secure object receives from other software.

Thus, in addition to protecting a secure application from attacks from "outside" the application, the architecture described by the present invention also protects against attempts to introduce malware "inside" the application, via attacks such as buffer overflow or stack overflow attacks. This architecture provides a foundation for providing strong end-to-end security in a network environment.

This new architecture, which the present inventors refer to as "SecureBlue++", builds upon the earlier "SecureBlue" secure processor technology, which has been used in tens of millions (i.e., 55 million, as of the time of filing this application) of CPU chips to protect sensitive information from physical attacks.

BRIEF DESCRIPTION OF THE DRAWINGS

The foregoing and other purposes, aspects and advantages will be better understood from the following detailed description of an exemplary embodiment of the invention with reference to the drawings, in which.

EXEMPLARY EMBODIMENTS OF THE INVENTION

Figure 1:
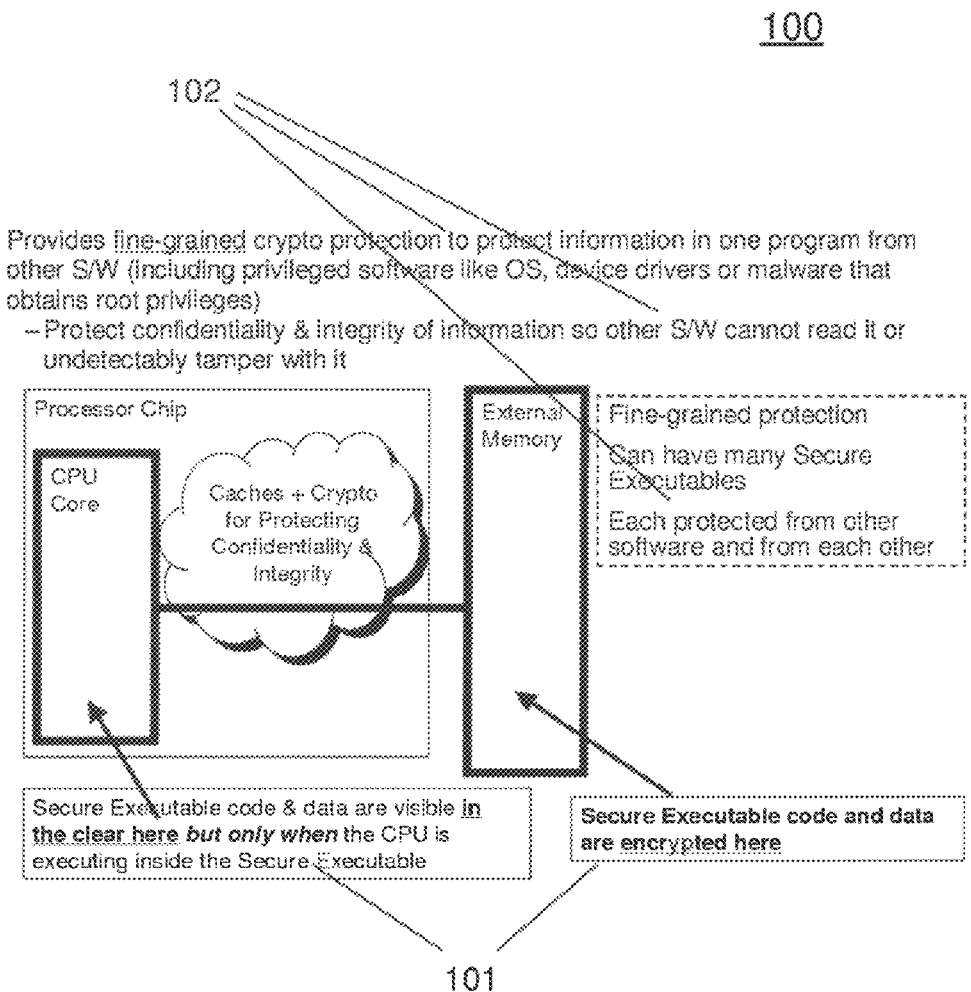
FIG. 1 shows the basic capability of the SecureBlue++ architecture 100, as introduced in the co-pending applications.

Referring now to the drawings, exemplary embodiments of the method and structures according to the present invention are now discussed.

The above-identified co-pending applications described the SecureBlue++ mechanisms that protect the confidentiality and integrity of information in an application program from an "external attack" so that "other software" outside of the application cannot read or undetectably tamper with information inside the application. As discussed in these co-pending applications, "other software" means all the other software on a system including other applications as well as privileged software, like the operating system, device drivers, or applications running with root (or super-user) privileges, or malware that obtains root privileges by exploiting a vulnerability in privileged software. In a SecureBlue++ system, information is "in the clear" when it is inside the CPU chip but encrypted whenever it is outside the CPU chip boundary. This encryption protects the confidentiality and integrity of code and data from physical probing or physical tampering.

SecureBlue++ builds upon SecureBlue, and is exemplarily shown in the configuration 100 of FIG. 1. Like the previous SecureBlue technology, SecureBlue++ protects against physical attacks (e.g., label 101 shows how code and data is encrypted when in memory but gets decrypted to become visible when executed in the CPU), but SecureBlue++ additionally uses "fine-grained" SecureBlue-like crypto protection with context-labeling in the CPU that also protects the confidentiality and integrity of information in an application from all the other software on a system. Thus, SecureBlue++ adds features, described by label 102, to the SecureBlue mechanism so that code and data in one application is protected from other software, including the operating system, device drivers and other programs.

Importantly, it does this in a way that is largely transparent to applications.

Figure 2:
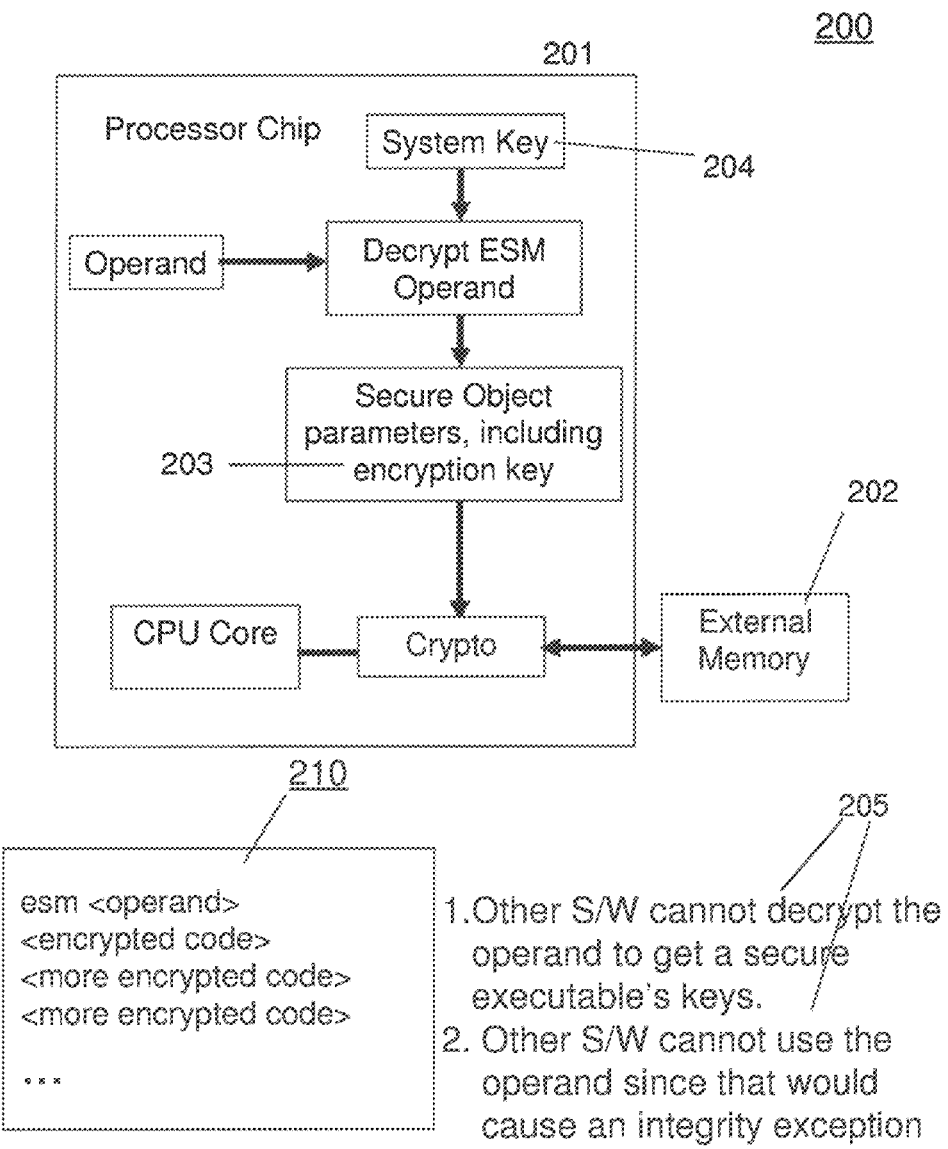
FIG. 2 exemplarily shows the mechanism 200 of the EnterSecureMode (esm) instruction, as used in the basic SecureBlue++ architecture.

As exemplarily shown in FIG. 2, in the previously-described SecureBlue++ mechanism, when an application's information is outside the processor chip 201 (e.g., when the application is in the file system prior to execution, or when it is in memory 202 or in the paging system during execution) it is encrypted under keys 203,204 that are not available to any other software and an integrity tree is used to detect tampering. Integrity protection (as well as confidentiality protection) is continuous—not just at application launch time. When an application's information is inside the CPU chip 201 (e.g., in on-chip caches), it is in the clear and context labels prevent other software from accessing or tampering with that information.

Since an application's information is encrypted whenever it is outside the CPU and since other software cannot access an application's cleartext information inside the CPU, other software such as the page demon or malware can only see the encrypted form of an application's information. Thus an application's information is protected from all the other software on the system including privileged software like the operating system, device drivers or applications running with root privileges—or malware that obtains root privileges by exploiting a vulnerability in privileged software.

Unlike systems that "measure" boot code, operating system code and device driver code at system boot time and then trust this code during execution, in our architecture, an application does not need to trust the operating system or any other software. An application in a SecureBlue++ system uses operating system services for scheduling, paging, I/O, interrupt handling etc. but it does not trust the operating system with any sensitive information. This is analogous to the way 401 we use the Internet today when we make an online purchase via https. We use the Internet to transport our packets but we do not give it access to any sensitive information in these packets. A malicious network operator may delay or drop the packets, but it cannot violate their confidentiality or integrity. In similar fashion, the SecureBlue++ technology allows an application to use operating system services e.g. scheduling, I/O, paging, interrupt handling without giving the operating system or device drivers access to any sensitive information.

A SecureBlue++ system thus minimizes the amount of code that needs to be trusted. The only code that an application needs to trust is the code within the application. SecureBlue++ allows us to know with a high level of confidence that information in an application is secure without having to prove the correctness of millions of lines of operating system, device driver, boot and other code. We only need to prove the correctness of the application.

As discussed above, the information in an application is cryptographically protected when the application is in a file system as well as throughout execution. This information is also protected while the application is in-transit prior to installation in the file system. Since the information in an application is always protected, the user can "compile in" a root (or roots) of trust that cannot be stolen or tampered with. Since a "compiled in" private key cannot be stolen, strong protection is provided against key theft and identity spoofing. And since a "compiled in" digital certificate cannot be tampered with, strong protection is provided for a chain of trust that allows an application to determine the authenticity of other entities in a network. Importantly, these roots of trust are protected from 1) an adversary that has root access to the system or 2) a malware-infected operating system.

Secure Applications (Also Known as Secure Executables)

In the architecture of the present invention, a secure application consists of 1) a cryptographically protected region containing encrypted code and data, 2) an initial integrity tree that protects the integrity of the protected region, and 3) an unprotected region that includes "communication" buffers and a loader that includes a new CPU instruction. As shown in FIG. 2, the esm instruction causes the CPU to 'enter secure mode' and process the encrypted code and data. Encrypted code and data is decrypted and checked for integrity in hardware as it is brought into the CPU chip (i.e. into an on-chip cache) from external memory;

and data is encrypted and integrity tree values are updated as information (i.e. dirty cache lines) are written out to external memory. The operand of the esm instruction, which includes the key for accessing the encrypted code and data as well as the initial value for the root of the integrity tree, is itself protected by a 'system key' that is not available to any software. Inset 210 of FIG. 2 exemplarily shows a portion of a secure object as residing in external memory 202.

Thus other software, such as 'memory scraping' malware cannot access or undetectably tamper with information in a secure application. (The esm operand is protected by a public/private key pair. The build machine encrypts the esm operand with the public key of the target machine. The private key, which is installed in the target machine at manufacture time, is used by the esm instruction at run-time to decrypt the operand.) In addition to loading the application's encryption key and integrity root into the crypto hardware, the esm instruction also allocates an ID, the Executable-ID or EID, that the hardware and the operating system will use to refer to this 'secure executable'.

As discussed above, information is stored in the clear in on-chip caches so cryptographic operations only occur when information moves between on-chip caches and external memory. In similar fashion, the checking and updating of integrity values only occur when information moves between on-chip caches and external memory. Thus the cryptographic and integrity overhead is close to zero when a secure application is getting cache hits.

Figure 3:
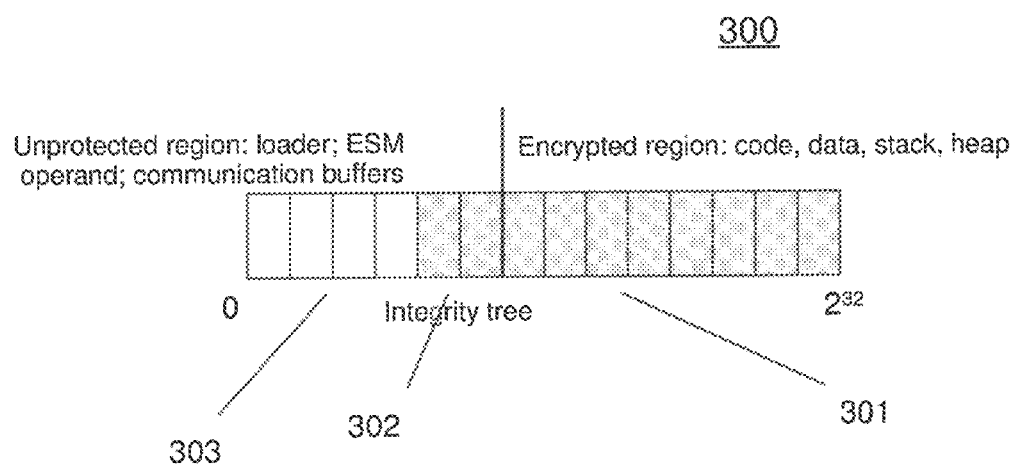
FIG. 3 exemplarily demonstrates in schematic format 300 the content and different regions of a secure object-based executable file.

FIG. 3 exemplarily shows a format 300 of a secure object executable file. The file contains (1) the Secure Object code and data in encrypted form 301, (2) the initial version of an integrity tree 302 that will be used at run-time to protect the integrity of the Secure Object's code and data, and (3) loader code including an esm instruction (in 303) to 'Enter Secure Mode'. As discussed in the first co-pending patent application above, the esm instruction allows a Secure Object's sensitive information to be decrypted on the path from external memory into the CPU and encrypted on the path from CPU to external memory.

FIG. 3 also shows communication buffers in the unprotected region 303. Thus, the unshaded region 303 of the binary file is an unprotected region that includes a loader, the esm instruction including the esm operand (or handle), and communication buffers. The shaded regions include the integrity tree 302 and the encrypted region 301 that includes one or more of code, data, stack, and heap data. The code and data are encrypted so that only the target CPU can read the binary, and only in secure mode.

Using the Operating System without Trusting the Operating System

As discussed above, a secure application (or secure executable) uses operating system services but does not trust the operating system with any sensitive information. In the paging subsystem for example, the operating system moves an application's pages between memory and disk but the pages are encrypted and the operating system has no access to the encryption key(s).

Another example is in network I/O. An application uses buffers in the unprotected region to send packets to and receive packets from a remote system. Since these buffers are in the unprotected region, they are not protected by the SecureBlue++ crypto. Thus the operating system and the remote system "see" the same information that the secure application "sees". On the other hand, if the contents of a buffer were cryptographically protected by the Secure-Blue++ crypto protection, the operating system and the remote system would not be able to "see" the content that the secure application "sees".

Since the CPU decrypts information that moves from a protected region in external memory into the CPU and since the CPU does not encrypt information that moves from the CPU to an unprotected region in external memory, the act of copying information from the protected region to the unprotected region has the effect of decrypting the information. Information in this region can be sent to a remote system and the remote system will be able to read it. Similarly the act of copying information from the unprotected region to the protected region has the effect of encrypting it under the secure application's encryption key. This is useful when information is received from a remote entity.

Figure 4:
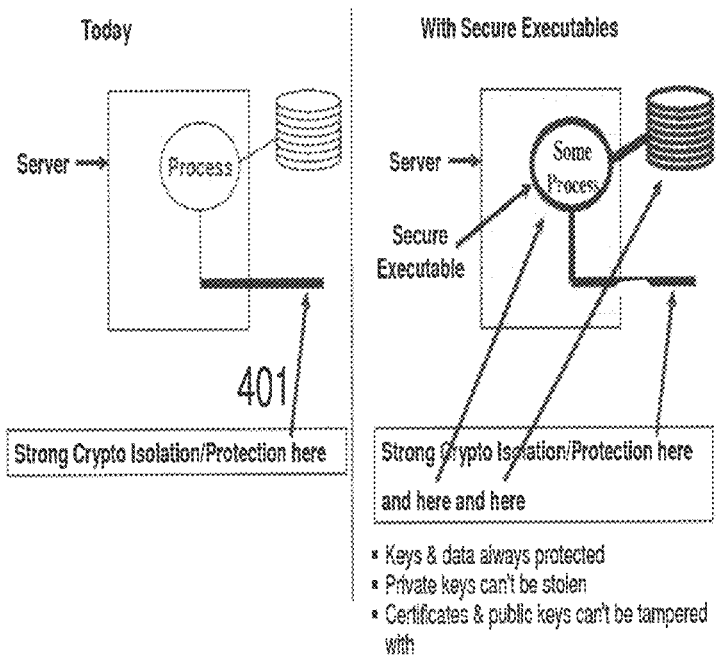
FIG. 4 exemplarily shows in schematic format 400 how a SecureBlue++ system can provide strong protection for an application's information including protection of that information while it is in memory, on disk, on network links or while it is in an operating system on its way to a network.

Note that although the unprotected region is not protected by the SecureBlue++ encryption, information in that region can still be cryptographically protected. Standard communications security mechanisms such as SSL or TLS can be used to provide end-to-end security. If a message that is to be sent to a remote system is encrypted under TLS before it is moved into the unprotected region, the message will be protected in the unprotected region in the same way that it is protected while it is traveling across a network. If, at the receiving end, the message is moved to the protected region before the TLS decryption, the message will have strong protection end-to-end with no point of vulnerability along the way, as shown in FIG. 4.

Note that the keys that a secure application uses for TLS or other communications security will be protected so other software including the operating system will not be able to access those keys or the packets protected by those keys, or undetectably tamper with either the keys or the packets. Keys inside a secure application can also be used to protect information stored in a file system, and other software including the operating system will not be able to access those keys or the contents of the files protected by those keys, as shown in FIG. 4.

System call "wrappers" can be linked with a secure application so that the application does not need to know about the protected and unprotected regions. These "wrappers" are library function that invoke the actual system calls and copy the contents of buffers between the protected and unprotected regions in a way that is transparent to the application while allowing the application to communicate intelligibly with remote systems.

In addition to hiding some complexity from the programmer, the wrappers also allow us to convert an existing application into a secure application in a way that is largely transparent to the application program.

Secure Context Switching

As discussed above, the operating system, device drivers and other software do not have access to a secure executable's information. When a secure executable is interrupted, the CPU hardware securely saves certain information before the OS or device drivers get control including the contents of the general purpose registers and the secure executable's encryption key and integrity root. When the operating system gets control, it has no access to any of this information (or the contents of the secure executable's cryptographically protected 'protected region') but it does have access to the EID of the secure executable that was interrupted—which is available in a (new) register. The operating system uses a new instruction, restorecontext, to securely restore and dispatch a previously suspended secure executable. The operand of this instruction is the EID of the secure executable to be dispatched. A third new instruction, deletecontext, is used by the operating system at process exit to indicate to the CPU that a secure process has completed execution and that the CPU can de-allocate its EID and free any resources associated with that EID Software Build Process The make process for a secure executable/secure application doesn't require any changes to programming languages, compilers or link-editors. An application is compiled in the usual manner and then linked with the wrappers discussed above and with a loader that includes the esm instruction (with a placeholder for the esm operand). An integrity tree is built for the code and data that will comprise the protected region and the protected region is then encrypted with a randomly generated symmetric key. The symmetric key and the root of the integrity tree are then encrypted under the public key of the target system to form the operand of the esm instruction. Finally, the integrity tree is combined with the protected region and the loader to form the complete secure executable binary.

Protecting from "Attacks from the Inside" Such as Stack and Buffer Overflow

As discussed above, SecureBlue++ can protect the confidentiality and integrity of information in an application from "external attack" so that "other software" cannot access or undetectably tamper with information inside the application. It can also protect an application from an "internal attack" in which an attacker attempts to exploit a vulnerability in an application's interfaces to get the application to execute code of the attacker's choosing via a software attack such as a buffer overflow or stack overflow attack.

As discussed above, the esm instruction enables the use of cryptographic hardware that protects the confidentiality and integrity of information in an application from "external attack". The esm instruction also establishes the address range that will be protected by the cryptographic hardware. As discussed previously, some portions of the address space (e.g. communication buffers) are not cryptographically protected.

To protect against attacks such as stack overflow and buffer overflow, the esm instruction will also set up two additional address ranges for an application. One of these will tell the CPU hardware that the address range corresponding to the application's code is, from the application's perspective, "read-only". The other will tell the hardware that the address range corresponding to the application's data, stack and heap is "no-execute". Thus if an attacker attempts to exploit a bug in an application so that the application will attempt to write into the code region or execute instructions from the data region, the attempt will fail.

As in the case of the encryption key and integrity root registers, the address range registers will be set by the CPU hardware in the execution of the esm instruction. These registers will not be accessible to software and they will be saved and restored by the CPU hardware during a context switch along with the encryption key and integrity root registers.

Figure 5:
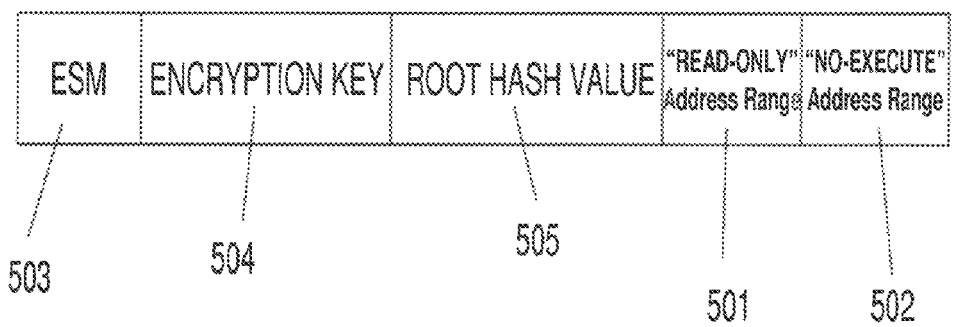
FIG. 5 exemplarily shows the esm instruction word format 500 for SecureBlue++ including the two new address ranges used by the current invention.

FIG. 5 exemplarily shows a format 500 of the esm operand as including the two new fields 501, 502 for protecting against attempts to introduce malware inside an application. The esm operand also includes the encryption key 504 that is used to decrypt and encrypt Secure Object code and data, as that information moves between the CPU and external memory, and the initial value 505 of the root of the hash tree that protects the integrity of the Secure Object code and data.

Thus, the present invention describing SecureBlue++ extends the functionality of the esm instruction described in the co-pending applications by setting up two additional ranges for an application, the above-described address range which tells the CPU hardware that the application's code is "read-only", and the above-described address range, which tells the CPU hardware that the application's data, stack, and heap is "no-execute".

In an alternate design, a single additional address range could be used to specify both the "read-only" and "no-execute" regions within the larger cryptographically protected region. For example, the additional address range could be used to specify that a portion of the cryptographically protected region is "read-only" and the rest is "no-execute".

So, if an attacker attempts to exploit a vulnerability in an application interface so that the application will attempt to write into the code region or execute instructions from the data region in order to get the application to execute code of the attacker's choosing, the attempt will fail.

As in the case of the encryption key and integrity root registers, these address ranges will be set by the CPU hardware in the execution of an esm instruction. These registers will not be accessible by software and will be saved and restored by the hardware during a context switch along with the encryption key and integrity root registers.

Figure 6:
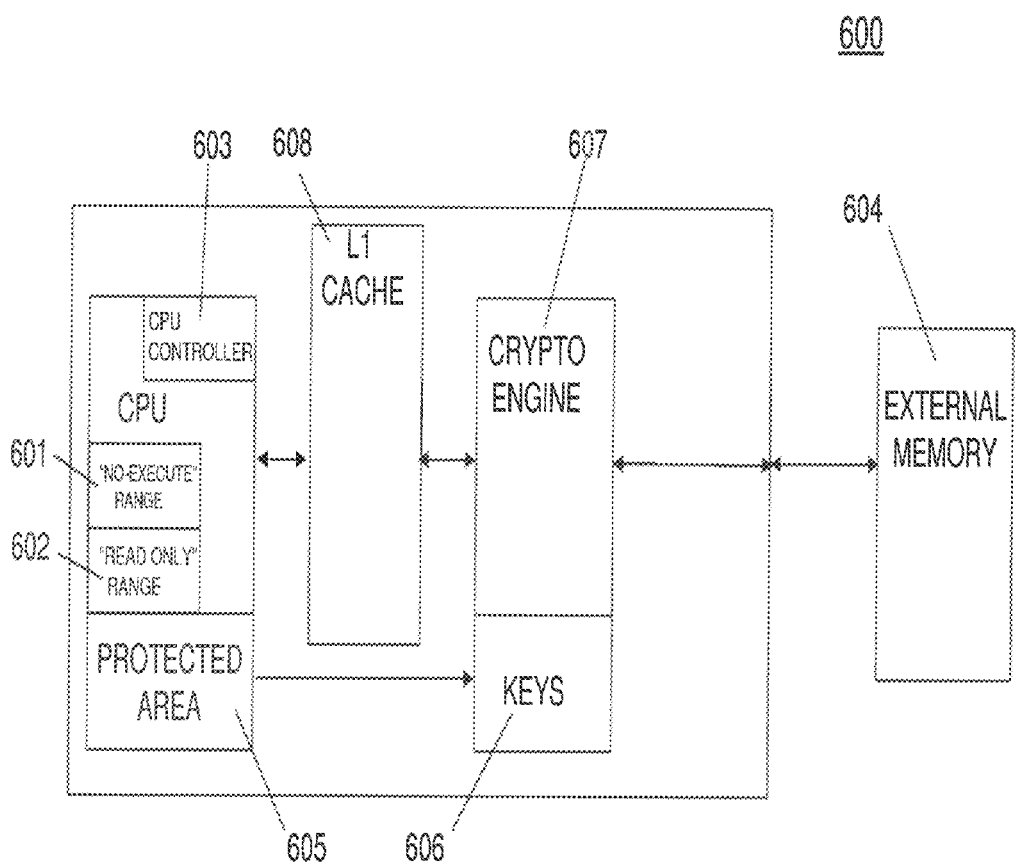
FIG. 6 shows an example of a computer architecture 600, including the CPU registers 601, 602 that implement the "read only" and "no-execute" ranges specified in the esm instruction.

FIG. 6 shows an exemplary computer configuration 600 that could be used to implement the present invention, including the "NO-EXECUTE" and "READ ONLY" registers 601,602 along with the CPU controller 603 that would enforce the "READ ONLY" and "NO-EXECUTE" protections. FIG. 6 also shows external memory 604, the protected area 605 which stores the encryption key 606 used by crypto engine 607 to decrypt a secure object from memory 604 that is loaded in cleartext form into cache 608 for execution by the CPU. Although FIG. 6 exemplarily shows the cache 608 as receiving the decrypted object information, other configurations are possible, including configurations in which higher level caches, such as an L2 cache, are used to store the secure object while it is in the clear. In such alternative configurations, the higher level cache(s) would also be located to the left of the crypto engine 607.

Protection Options

As discussed previously, SecureBlue++ can protect the confidentiality and integrity of an application's code and data. But other options are possible. While the integrity of code and data will always be important, in some cases one may not need or want cryptographic confidentiality protection—for code or for data. A SecureBlue++ system could be designed so that The integrity of code and data is protected in all secure executables The confidentiality of data is protected in secure executables that require that protection The confidentiality of code is protected in secure executables that require that protection.

Depending on application requirements and "make flags", secure executables could be built with various combinations of protection. The particular combination that would be used for a given secure executable would be communicated to the CPU via the esm operand.

Deployment Considerations for Secure Executables

The esm operand of a secure executable is encrypted using the system key of the target machine. This adds some complexity to the process of building and distributing software since different target machines will normally have different system keys. The build machine could build a unique binary for each target machine. Alternatively, the build machine could build and send a single binary to all the targets. This approach would leverage a special Deployment Server (DS) process on the target machine.

The DS would itself be a secure executable that protects sensitive information—including software that it receives from a build machine. The build machine would compile and link the software that will comprise a secure executable and securely send the software to the DS process on the target machine via standard communications security mechanisms such as SSL or TLS. The DS will generate an encryption key for the received software and encrypt the software under this key. It will then encrypt the esm operand, which includes this encryption key and the initial integrity root, under the system key of the target system.

Thus the transmitted secure executable software is protected by standard communications security mechanisms until it is safely inside the DS secure process and it will be protected inside the DS process until it has been encrypted and customized for the particular target machine.

Once the received software and its esm operand have been encrypted, the received software is a secure executable that can be safely installed in the file system.
Thus the software is always protected from the time it leaves the build machine until it is safely installed in the file system on the target machine with no point of vulnerability along the way.

Note that the DS could also use digital certificates or public keys to validate a digital signature on received software to ensure that any software received is from a legitimate trusted software publisher. Since the DS process is itself a security executable, the integrity of these digital certificates or public keys would be protected from tampering.

Similarly, secure executable mechanisms and digital certificates on the build machine would allow the build machine to validate the trustworthiness of the hardware of the target machine.

Demonstration Results

An initial prototype of a SecureBlue++-enabled CPU has been implemented on a CPU simulator and (a slightly modified) Linux (that uses the restorecontext and deletecontext instructions discussed above) and some simple demo applications have been run on this prototype in a real network. In the demonstration, it was demonstrated how a simple credit-card-authorization application can be built as either a "plain vanilla" application or as a secure executable using the same source code. It was then demonstrated that malware can obtain sensitive information from the plain vanilla application (either while it is in the file system or while it is in execution), while malware cannot obtain any sensitive information from the secure executable version.

Therefore the present invention has been demonstrated as an innovative secure processor architecture that provides for verifiably, secure applications. The architecture protects the confidentiality and integrity of information in an application so that 'other software' cannot access that information or undetectably tamper with it. In addition to protecting a secure application from attacks from "outside" the application, the architecture also protects against attempts to introduce malware "inside" the application via attacks such as buffer overflow or stack overflow attacks.

This architecture minimizes the amount of code that needs to be trusted. An application uses operating system services but does not need to trust the operating system or device drivers with sensitive information. The only code that an application needs to trust is its own code. The architecture allows us to know with a high level of confidence that information in an application is secure without having to prove the correctness of millions of lines of operating system, device driver, boot or other code. We just need to trust that the application itself is correct.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

The invention claimed is:

1. A computer system, comprising:
    a crypto mechanism that decrypts and integrity-checks Secure Object information as the Secure Object information moves into the computer system from an external storage and encrypts and updates an integrity value for Secure Object information as the Secure Object information moves out of the computer system to the external storage; and
    a mechanism that protects a Secure Object from code that the Secure Object receives from other software, using information contained in the Secure Object,
    wherein the Secure Object comprises information that is cryptographically protected so that other software on said computer system cannot access or undetectably tamper with said Secure Object information, thereby protecting both a confidentiality and an integrity of the Secure Object information from other software while making an unencrypted form of the Secure Object information available to the Secure Object itself during execution of the Secure Object.

2. The computer system of claim 1, wherein the mechanism that protects a Secure Object from code comprises at least one register defining an address range that provides at least one of a "read-only" range and a "no-execute" range for a Secure Object.

3. The computer system of claim 2, wherein said computer system comprises a CPU capable of executing an EnterSecureMode (esm) instruction that enables a Secure Object to access in unencrypted form its cryptographically protected information wherein said address range derives from an operand of the esm instruction.

4. The computer system of claim 2, wherein said at least one register comprises:
    a first register storing a first address range in the Secure Object that is "read-only"; and
    a second register storing a second address range in the Secure Object that is "no-execute".

5. The computer system of claim 1, wherein said mechanism that protects a Secure Object from code that the Secure Object receives from other software:
    precludes attempts to write into a code region of the Secure Object; and
    precludes attempts to execute instructions from a data region of the Secure Object.

6. The computer system of claim 1, wherein said other software comprises any of:
    other applications;
    privileged software such as an operating system;
    device drivers;
    applications running with root or superuser privileges; and
    malware that potentially obtains root privileges.

7. The computer system of claim 2, further comprising a controller that implements protection features associated with said address range.

8. The computer system of claim 3, wherein said esm instruction decrypts an operand using a private key of a public/private key pair.

9. The computer system of claim 2 wherein said at least one register is not be accessible by software and is saved and restored during a context switch.

10. The computer system of claim 1 wherein said mechanism that protects a Secure Object from code that the Secure Object receives from other software protects against software attack including an attack based on a buffer overflow.

11. The computer system of claim 1 wherein said mechanism that protects a Secure Object from code that the Secure Object receives from other software derives, based on information in said Secure Object, at least one of an address range that the Secure Object cannot write into and an address range from which the Secure Object cannot execute instructions.

12. A method, comprising:
  decrypting and integrity-checking Secure Object information as the Secure Object information moves into the computer system from an external storage;
  encrypting and updating an integrity value for the Secure Object information as the Secure Object information moves out of the computer system to the external storage; and
  protecting a Secure Object from code that the Secure Object receives from other software, using information contained in the Secure Object,
  wherein said Secure Object comprises information that is cryptographically protected so that other software on said computer system cannot access or undetectably tamper with said information, thereby protecting both a confidentiality and an integrity of the Secure Object information from other software while making an unencrypted form of the Secure Object information available to the Secure Object itself during execution of the Secure Object.

13. The method of claim 12, wherein said computer system comprises at least one register defining an address range that provides at least one of a "read-only" range and a "no-execute" range for a Secure Object.

14. The method of claim 13, wherein said computer system comprises a capability to execute an EnterSecureMode (esm) instruction that enables a Secure Object to access in unencrypted form its cryptographically protected information wherein said address range derives from an operand of the esm instruction.

15. The method of claim 13, wherein said at least one register comprises:
  a first register storing a first address range in the Secure Object that is "read-only"; and
  a second register storing a second address range in the Secure Object that is "no-execute".

16. The method of claim 13, further comprising a method that implements protections associated with said address range.

17. The method of claim 13, further comprising a mechanism wherein said at least one register will not be accessible by software and will be saved and restored by hardware during a context switch.

18. The method of claim 12, as implemented as a series of machine-readable instructions tangibly embodied on a memory device on said computer system.

19. The method of claim 18, wherein said memory device comprises instructions in a controller.

20. A controller on a computer system providing support for a Secure Object, wherein said controller:
  allows a Secure Object to access its cryptographically protected information in unencrypted form;
  allows other software to only access the Secure Object's cryptographically protected information in encrypted form; and
  includes a mechanism that protects a Secure Object from code that the Secure Object receives from other software, and
  wherein said Secure Object comprises information that is cryptographically protected so that other software on said computer system cannot access or undetectably tamper with said information, thereby protecting both a confidentiality and an integrity of the Secure Object information from other software while making an unencrypted form of the Secure Object information available to the Secure Object itself during execution of the Secure Object.

21. The controller of claim 20, comprising at least one register defining an address range that provides at least one of a "read-only" range and a "no-execute" range for a Secure Object.

22. The controller of claim 21, wherein an address range stored in said at least one register derives from an operand of an EnterSecureMode (esm) instruction that enables a Secure Object to access its cryptographically protected information in unencrypted form.

23. The controller of claim 21, wherein said at least one register comprises:
  a first register storing a first address range in the Secure Object that is "read-only"; and
  a second register storing a second address range in the Secure Object that is "no-execute".

24. The controller of claim 21 wherein said at least one register is not accessible by software and will be saved and restored during a context switch.

* * * * *